United States Patent
Hallivuori

(10) Patent No.: US 8,095,711 B2
(45) Date of Patent: Jan. 10, 2012

(54) METHOD AND DEVICES FOR COMPRESSING DELTA LOG USING FLASH TRANSACTIONS

(75) Inventor: Matti Hallivuori, Espoo (FI)

(73) Assignee: Tellabs Oy, Espoo (FI)

( * ) Notice: Subject to any disclaimer, the term of this patent is extended or adjusted under 35 U.S.C. 154(b) by 863 days.

(21) Appl. No.: 12/164,133

(22) Filed: Jun. 30, 2008

(65) Prior Publication Data

US 2009/0013126 A1    Jan. 8, 2009

(30) Foreign Application Priority Data

Jul. 2, 2007    (FI) ...................................... 20070520

(51) Int. Cl.
*G06F 5/00*    (2006.01)
(52) U.S. Cl. ............................................ 710/74; 710/34
(58) Field of Classification Search ......................... None
See application file for complete search history.

(56) References Cited

U.S. PATENT DOCUMENTS

| | | | |
|---|---|---|---|
| 5,586,285 A * | 12/1996 | Hasbun et al. | 711/103 |
| 5,860,124 A | 1/1999 | Matthews et al. | |
| 6,202,090 B1 | 3/2001 | DiSimone | |
| 7,376,772 B2 * | 5/2008 | Fallon | 710/68 |
| 7,606,954 B2 * | 10/2009 | Brink et al. | 710/68 |
| 7,676,282 B2 * | 3/2010 | Bosley | 700/24 |
| 2005/0071075 A1 | 3/2005 | Avery et al. | |
| 2005/0210077 A1 | 9/2005 | Balakrishnan | |
| 2005/0268341 A1 * | 12/2005 | Ross | 726/26 |
| 2008/0228998 A1 * | 9/2008 | Colecchia et al. | 711/103 |

FOREIGN PATENT DOCUMENTS

| | | |
|---|---|---|
| CN | 1 664 815 | 9/2005 |
| EP | 1 357 701 | 10/2003 |
| WO | 01/31458 A1 | 5/2001 |

OTHER PUBLICATIONS

Gal E, et al., "Mapping structures for flash memories: techniques and open problems", Proc. IEEE Int. Conf. on Software—Science, Technology & Engineering (SwSTE'05), 2005, pp. 1-10.
Finnish search report in corresponding FI 20070520.
Search Report dated Sep. 23, 2008 corresponding to EP 08 15 9167.

\* cited by examiner

*Primary Examiner* — Cheng-Yuan Tseng
(74) *Attorney, Agent, or Firm* — Young & Thompson

(57) ABSTRACT

Each received piece of configuration data is added at a next currently free location in a volatile buffer. The contents of the volatile buffer are compressed after adding each received piece of configuration data. The compression result is stored in a non-volatile flash memory. If the compression result was shorter than a limit, it is allowed to be overwritten in the flash memory by a next compression result. If the compression result was longer than the limit, it is stored in the flash memory and the next compression result is directed to a different location in the flash memory.

19 Claims, 4 Drawing Sheets

METHOD AND DEVICES FOR COMPRESSING DELTA LOG USING FLASH TRANSACTIONS

TECHNICAL FIELD

The invention concerns in general the technical field of storing important digital data in memory in a way that enables subsequently restoring the data in the case of an unexpected operational failure. Especially the invention concerns storing the frequently changing configuration data in a router, using a non-volatile flash memory and data compression.

BACKGROUND OF THE INVENTION

A router must store the changes in router configuration that it receives every now and then as new connections are set up and old ones become obsolete. Configuration data is essential for the correct operation of the router, and it must be stored in a form from which it can be later retrieved even if an unexpected error has occurred and caused data in the volatile run-time memory to become corrupt or vanish. A file that contains accumulated data about changes in router configuration is frequently referred to as a delta log.

Some prior art routers utilize flash memory as a non-volatile storage, into which the delta log is stored in compressed form. The storing algorithm for storing the delta log must take into account that data is accumulated continuously, and a failure may occur at any moment, so data should not be allowed to accumulate in volatile memory only for a long time before a next copy to non-volatile flash memory is made. On the other hand the known structure and operation of flash memory is ill suited for continuous bit-by-bit storing, and favours handling the flash memory in larger units called records.

FIG. 1 illustrates a known way of utilizing flash memory for storing a delta log according to prior art. Two separate sections of flash memory have been allocated, referred here to as the flash buffer 101 and the flash file 102. Configuration data is first stored in the flash buffer 101 and only transferred to the flash file 102 after a large enough chunk of data has accumulated to essentially fill the flash buffer 101.

At step 111 both sections of flash memory are empty. A write pointer, illustrated schematically as a small arrow, shows the location in each section of flash memory where the next write operation will begin. At step 112 a piece of configuration data 103 is written into the flash buffer, causing the write pointer to move to the next free space in the buffer. The old location of the write pointer is shown with an arrow in brackets. Nothing happens in the flash file yet. A similar incident occurs at step 113, where a next piece of configuration data 104 is written into the flash buffer. Only at step 114, when the flash buffer becomes full, something is written to the flash file also: the accumulated contents of the flash buffer are compressed using some suitable data compression algorithm, and the compression result 105 is written to the flash file. The write pointer in the flash file advances to point at the next free location. At step 115 the flash buffer is cleared, and a new round of accumulating configuration data into the flash buffer begins. Next time when compression occurs, the new compression result will follow the previous one in the flash file.

The drawback of the arrangement of FIG. 1 is the relatively large requirement of flash memory space.

SUMMARY OF THE INVENTION

An objective of the invention is to present a method and devices for storing a delta log with low requirements for memory space, especially flash memory. Another objective of the invention is that the method and devices for storing a delta log are simple and robust, and applicable to a wide variety of router implementations.

The objectives of the invention are achieved by maintaining a buffer for new configuration data in volatile memory, compressing the contents of the buffer after each incident of adding new data, and utilizing flash transactions to either over-write previous compression results in flash memory or write the new compression result into a new record depending on its length.

A method according to the invention is characterised by the steps recited in the characterising part of the independent claim directed to a method.

A router device according to the invention is characterised by the features recited in the characterising part of the independent claim directed to a router device.

A computer program product according to the invention is characterised by the features recited in the characterising part of the independent claim directed to a computer program product.

When new data is written into a flash memory, it can either replace an existing record (i.e. the existing record may be updated) or it can go to a completely virginal record. Here it is suggested that a choice between these two possibilities is made based on the current length of the compressed delta log buffer. If the compression result is much shorter than a record, it will only update an existing, immediately earlier written record. The constant accumulation of configuration data ensures that little by little the compression result becomes longer, until it is long enough to fill the current record, and possibly overflow partly to the next record in the flash memory. At that point the completed record is "frozen", the buffer is cleared, and the process starts anew, with the new writing point in the flash memory being selected either from the record having leftovers from the frozen record or from next logical record in the flash memory. If the record having leftovers from the frozen records is chosen, the writing point is set immediately after the used space in the record.

The exemplary embodiments of the invention presented in this patent application are not to be interpreted to pose limitations to the applicability of the appended claims. The verb "to comprise" is used in this patent application as an open limitation that does not exclude the existence of also unrecited features. The features recited in depending claims are mutually freely combinable unless otherwise explicitly stated.

The novel features which are considered as characteristic of the invention are set forth in particular in the appended claims. The invention itself, however, both as to its construction and its method of operation, together with additional objects and advantages thereof will be best understood from the following description of specific embodiments when read in connection with the accompanying drawings.

DETAILED DESCRIPTION OF THE INVENTION AND ITS ADVANTAGEOUS EMBODIMENTS

Figure 2:
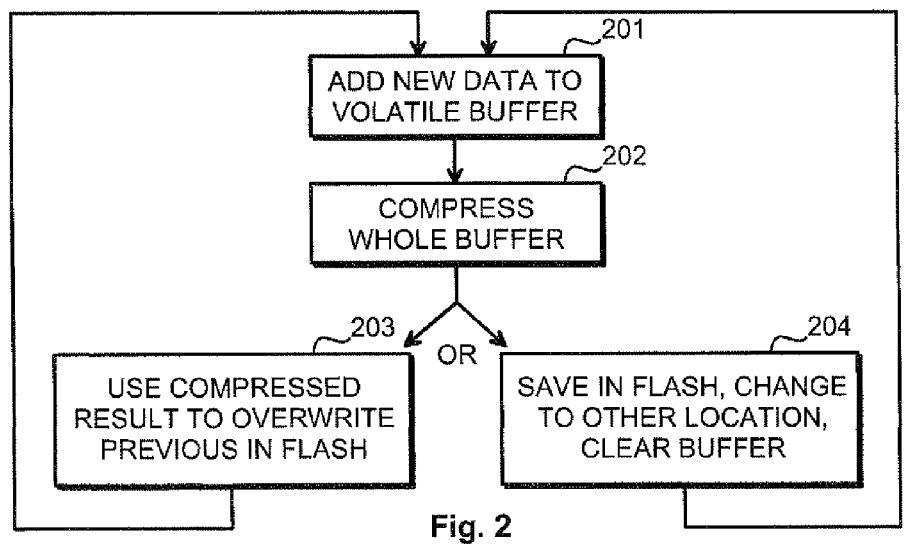
FIG. 2 illustrates a principle according to an embodiment of the invention.

FIG. 2 illustrates a principle of combining the use of a volatile buffer and a flash memory according to an embodiment of the invention. When new configuration data arrives, it is first written into a volatile buffer as shown in block 201. In a router the new configuration data appears in the form of protocol-defined commands consisting of character strings, possibly augmented with other text-formed data. The volatile buffer is essentially larger than the size of a record in a flash memory; the buffer may be at least ten times the size of a record.

At block 202 a compression algorithm is applied to compress the whole contents of the volatile buffer. The actual contents of the buffer, as well as the efficiency of the compression algorithm, determine how many bits will be in the compression result. If the buffer was only beginning to fill up, i.e. it only contained a single piece of configuration data before compression took place, the compression result may be even longer than the original piece of configuration data. However, already with two pieces of configuration data accumulated in the buffer the compression ratio (length of the compressed result in relation to the amount of uncompressed configuration data) will be more advantageous, and it will get even better the more pieces of configuration data had accumulated in the buffer.

We assume that there is a predetermined limit or threshold value, to which the length of the compressed result is compared. The limit or threshold value is slightly larger than the size of a record in a flash memory, so that when the length of the compressed result meets the limit or threshold, it will fill slightly more than one complete record in the flash memory. If the compression result was smaller in bytes than the limit or threshold value, it is used to overwrite (i.e. update) the immediately previously stored compression result in the flash memory according to block 203, and it remains there waiting to be in turn overwritten by the next compression result. If the compression result was large enough to fill at least a complete record, it is stored in the flash memory (i.e. it overwrites the immediately previous compression result but is thereafter "frozen", and not subject to further over-writes) and the volatile buffer is cleared as in block 204. Next time after adding new configuration data and compressing, the write operation will target a new location in the flash memory.

Figure 3:
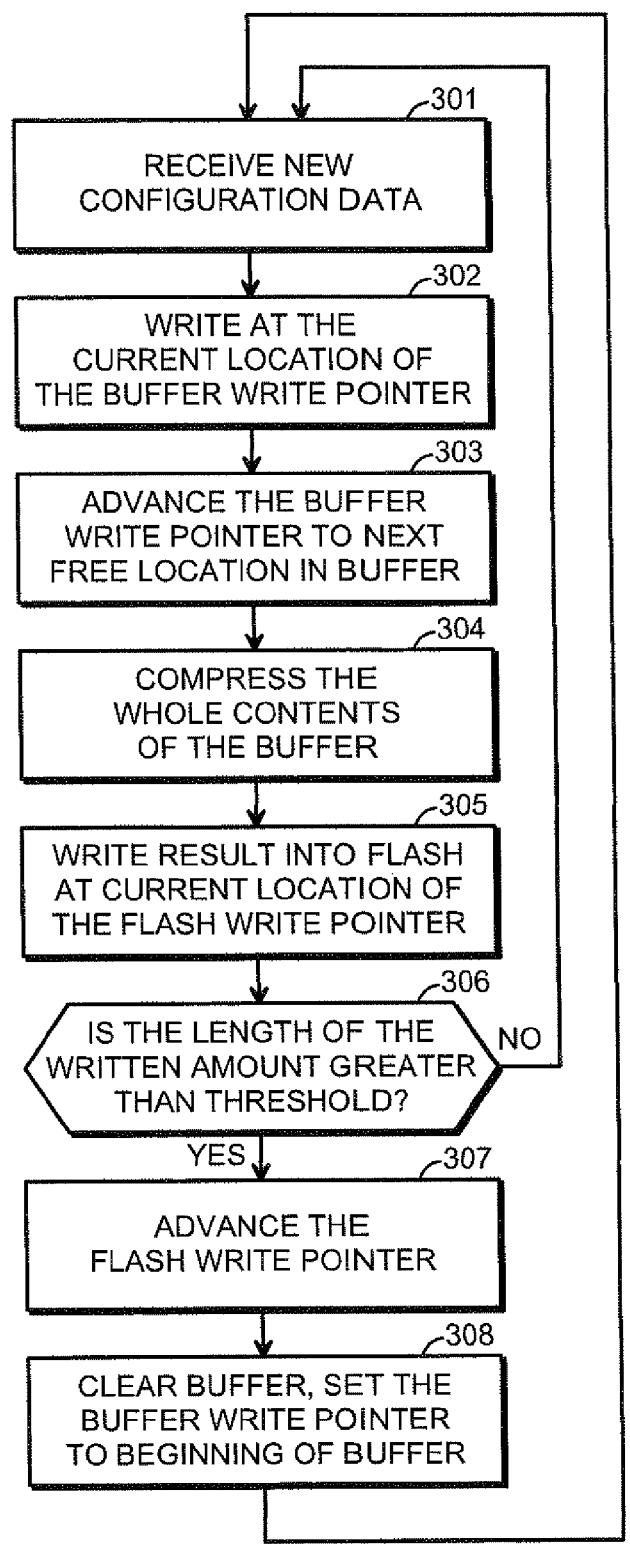
FIG. 3 illustrates a method according to an embodiment of the invention.

FIG. 3 illustrates a method according to an embodiment of the invention in a more systematical form as a flow diagram. At step 301 a new piece of configuration data is received. At 302 it is written into a volatile buffer, beginning at a location where a buffer write pointer shows to be free. After writing, the buffer write pointer is advanced at step 303 to point at the next remaining free location in the volatile buffer.

At step 304 the whole contents of the volatile buffer are compressed. The compression result is written into flash memory at step 305, more particularly to a record of the flash memory pointed at by a flash write pointer. Writing to a record of a flash memory is most advantageously accomplished as a flash memory transaction, like the one explained in the patent application published as WO 01/31458 filed by the same applicant an incorporated herein by reference. A transaction is a collection of operations that must all succeed or all fail. Changing the configuration data of a router is a typical application of transactional nature, because if the routing application does not succeed in ensuring that the new configuration has been safely recorded in non-volatile memory, it must not take it into use at all. If the routing application operated according to configuration data stored only in volatile memory, and the non-volatile flash memory contained something else, a nastily timed operational failure might lead to recovering to different kind of operation than what was actually in use before the failure.

It is noted that due to the nature of flash memory, updating a record does not strictly speaking mean that data would be stored again in the exactly same memory location. As is shown in the other patent application mentioned above, updating a record involves a relatively large number of steps, during which the updated data is written into a new memory location and the old memory location is marked as dirty. A housekeeping routine of the flash memory arranges the use of memory locations, so that "dirty" locations return to use after a while. However, since the housekeeping operations are transparent to an application utilizing a flash memory, it is customary to speak about the records of a flash memory as logical memory locations, ignoring any dependence on any physically existing memory locations.

The transaction type routines of utilizing the flash memory automatically ensure that no unnecessary copies of the data are stored. The non-existence of unnecessary copies helps to keep the hardware requirements (the amount of installed flash memory) at a very reasonable level.

At step 306 a check is made, whether the amount of data written into the flash memory reached a certain threshold. If not, the method returns to step 301 with no changes in the flash write pointer. As a result, the next time a compression result is written into the flash memory, it will overwrite (i.e. update) the immediately previously written record.

If the length in bytes of the amount of data written into the flash memory had reached the threshold at step 306, the method proceeds to step 307 where the flash write pointer is advanced to point at a new record (in the same file as the previous record). At step 308 the volatile buffer is cleared, and the buffer write pointer is set to point at the very beginning of the freshly cleared buffer. Thereafter a return occurs to step 301.

It is not necessary to execute these method steps exactly in this order, as long as the same operational principle is preserved. For example, it would be possible to change step 303 from between steps 302 and 304 to before step 301. This would make it unnecessary to separately set the buffer write pointer to beginning at step 308, because immediately after clearing the buffer in step 308, setting the buffer write pointer to point to next free location would automatically make it point to the beginning.

Figure 1:
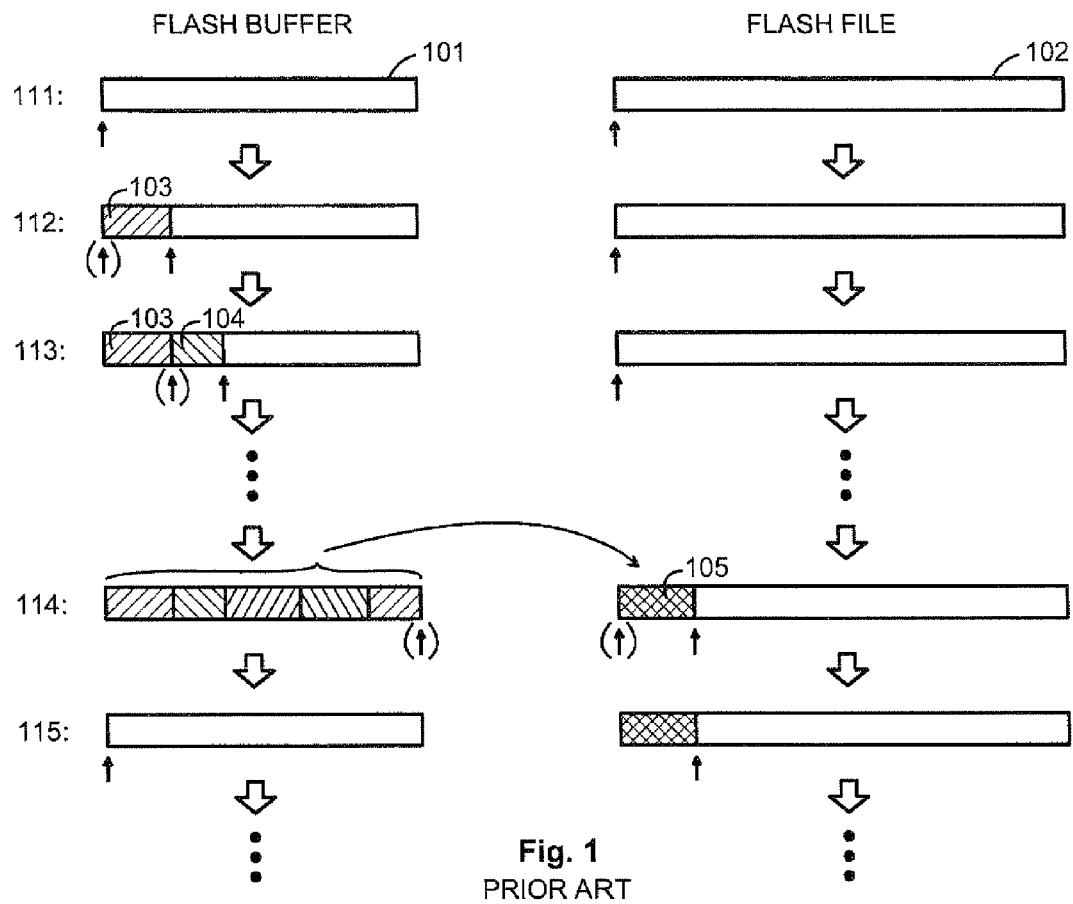
FIG. 1 illustrates a known way of using a flash memory to store a delta log.
Figure 4:
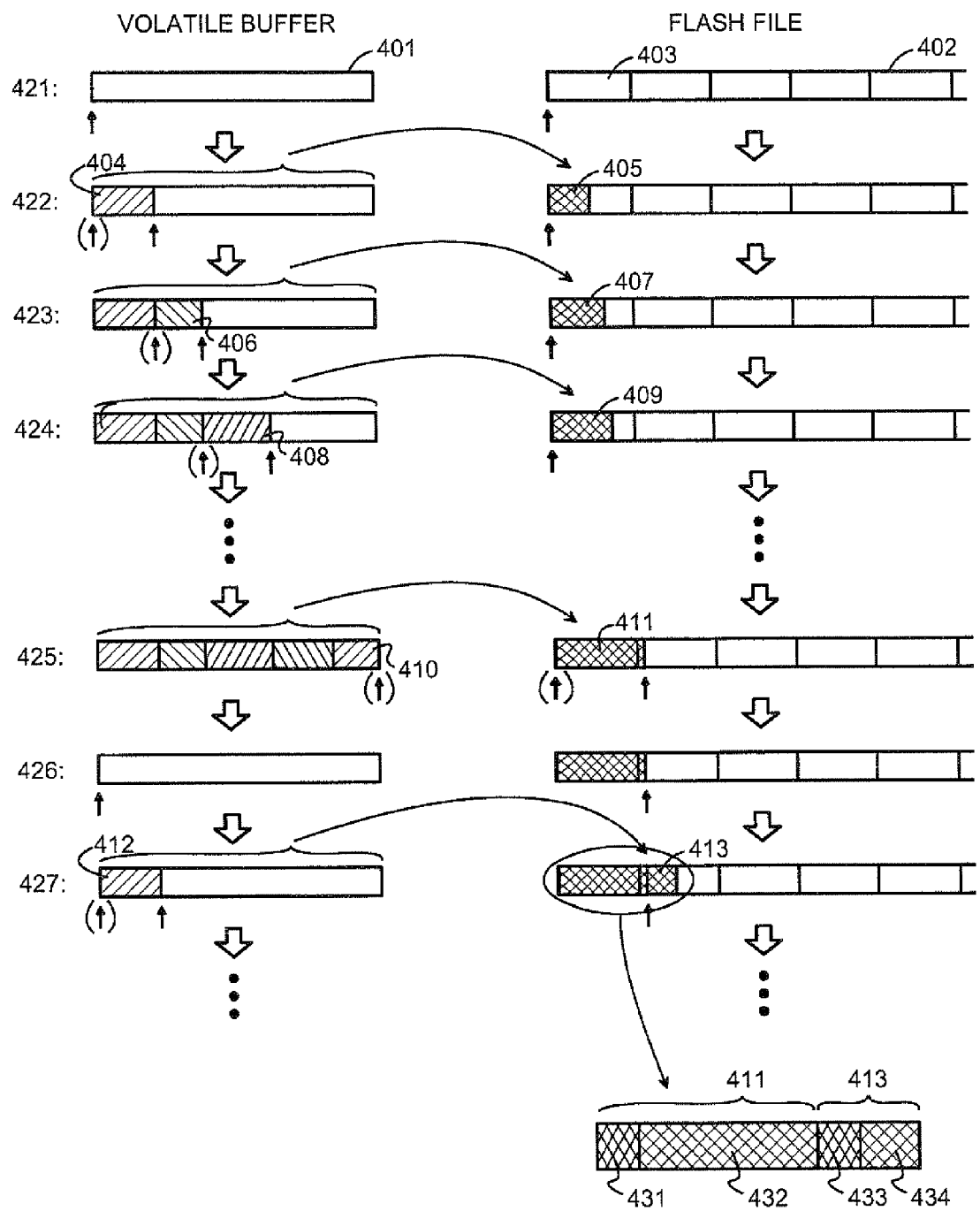
FIG. 4 illustrates a way of using memories to store a delta log according to an embodiment of the invention.

FIG. 4 illustrates the usage of a volatile buffer 401 and a flash file 402 according to an embodiment of the invention. The flash file 402 is divided into records, of which record 403 is shown as an example. Write pointers are illustrated as small arrows in analogous manner with FIG. 1.

At step 421 both the volatile buffer 401 and the flash file 402 are empty. At step 422 a piece of configuration data 404 is written into the volatile buffer. This causes the buffer write pointer to advance to the next free location. The whole contents of the volatile buffer are compressed, and the compression result 405 is written into the first record of the flash file. The compression result was shorter than a predetermined threshold, for which reason the flash write pointer is not advanced. Comparing to FIG. 3, step 422 in FIG. 4 ends with a return from step 306 to step 301.

Steps 423 and 424 are similar to step 422, with the newest piece of configuration data (406 at step 423 and 408 at step 424) being concatenated with the previously existing configuration data in the volatile buffer, and with each time the new compression result (407 at step 423 and 409 at step 424) updating the first record in the flash file. At step 425, after adding the piece of configuration data shown as 410, the length of the compression result reaches the threshold. Here this happens to coincide with the volatile buffer becoming full, but that is not a binding assumption; more probably the length of the compression result will reach the threshold already earlier, before the volatile buffer becomes full. It is typical to this embodiment of the invention that the threshold is bound to the length of the compressed result and not to the fill ratio or the remaining empty space of the volatile buffer before compression.

The compression result 411 that triggered the threshold condition is the last one to overwrite (update) the first record in the flash file. In conformity with step 307 in FIG. 3, the flash write pointer is advanced at step 425 to point at the second record of the flash file. Here we assume that the compression result was slightly longer than one record, and the leftovers not fitting in the first record go the next record, after which the flash write pointer is set to point at the first free location in the second record. An alternative would be to set the flash write pointer to point at a completely new record. At step 426 the volatile buffer is cleared, and the buffer write pointer is set to the very beginning of the volatile buffer (like in step 308 of FIG. 3). At step 427 the next piece of configuration data 412 to arrive starts the same process as at step 422, with the difference that the newest compression result 413 now goes to the second record, the very first part of which is already frozen and thus does not change in the subsequent update operations.

According to an embodiment of the invention, it is not only the pure output of the compression algorithm that gets stored into the flash memory. The insert at the bottom right of FIG. 4 shows how each compression result may consist of a header part and a body part, of which the header part includes information about the body part. For the compression result 411 there is the header part 431 and the body part 432, and for the compression result 413 there is the header part 433 and the body part 434 respectively. A useful piece of information that the header part may reveal is the length of the compression result in bytes. Later, when the contents of a flash file are scanned, it is more effective if the scanning algorithm may jump over the body parts with the help of the knowledge about how long they are. However, using a header part in the compression result is not necessary, because e.g. the length of the compression result may be detected in other ways by examining the compressed bytes themselves.

Figure 5:
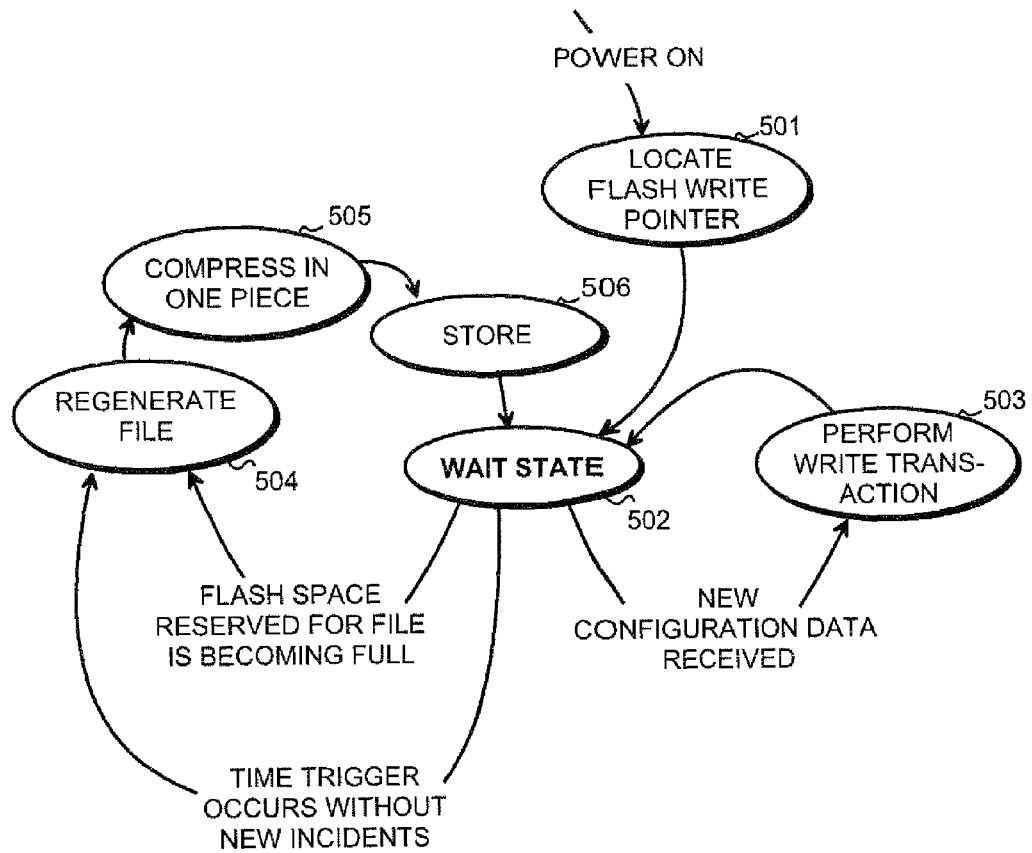
FIG. 5 illustrates an embodiment of the invention in the form of a state diagram.

Scanning flash files may become actual in a power-on situation, which is seen in the state diagram of FIG. 5. The state diagram is a high-level illustration of handling configuration data in a router according to an embodiment of the invention. After power-on, the stored flash files are scanned at state 501 to find the correct location for the flash write pointer and to enable regenerating the necessary routing information from the stored compressed delta log parts. After power-on has been successfully completed, the system assumes a wait state 502. If any time in the wait state some new configuration data arrives, it triggers a write transaction according to state 503. Whether the write transaction involves just updating an older flash record or whether it involves freezing a completed record and changing to use a new one depends on the length of the compression result, as was described extensively above with reference to FIGS. 2, 3 and 4.

At some stage the space reserved from the flash memory for the flash file will become full, which triggers regenerating the file according to state 504. Another criterion which is shown in FIG. 5 to potentially cause a transition from the wait state 502 to the file regeneration state 504 is the lapsing of a timeout, or an occurrence of a time trigger. If a certain length of time has passed without having to process any new configuration data, it may be advantageous to regenerate the configuration file. The configuration consists of a compressed basic configuration and the changes recorded in the delta log. Regeneration combines the changes with the basic configuration and removes redundant commands. Regenerating the whole configuration by dumping to file the actual running configuration, and compressing the regenerated result in one piece at state 505, allows reaching even further reductions in required non-volatile storage space. The regenerated and recompressed file is stored at state 506 before returning to the wait state 502.

Figure 6:
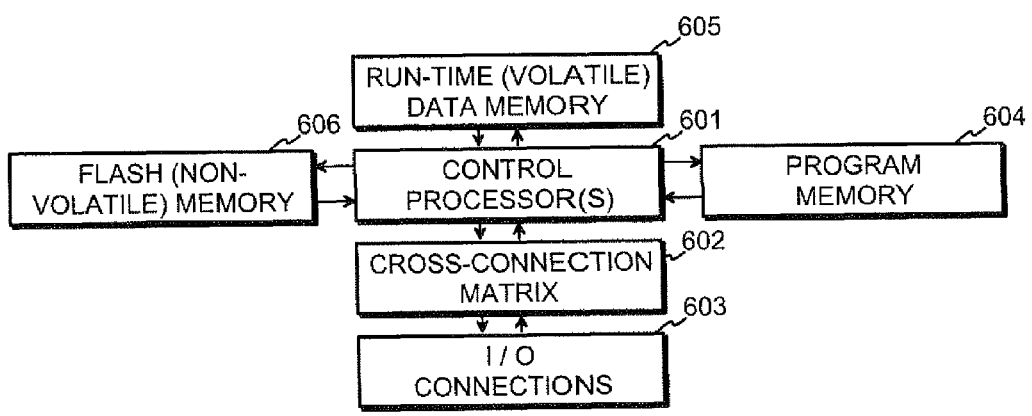
FIG. 6 illustrates a router device according to an embodiment of the invention.

FIG. 6 illustrates schematically a router device according to an embodiment of the invention. A control processor or control processors 601 execute the actual routing program to control a cross-connection matrix 602 where packets are appropriately switched to and from connections coming through an I/O block 603. The program is stored as computer-readable instructions in a program memory 604. The run-time (volatile) data memory 605 contains, among others, the volatile buffer referred to above. The flash file with its records is located in the flash (non-volatile) memory block 606. After having read the proper instructions from the program memory 604 the control processor(s) 601 know how to execute the steps and methods of FIGS. 2, 3, 4, and 5.

The invention claimed is:

1. A method for storing configuration data in a router, comprising:
    adding each received piece of configuration data at a next currently free location in a volatile buffer,
    compressing the contents of the volatile buffer after adding each received piece of configuration data, thus obtaining a compression result,
    storing the compression result in a non-volatile flash memory,
    if the compression result was shorter than a limit, allowing the compression result to be overwritten in the flash memory by a next compression result to be stored in the flash memory, and
    if the compression result was longer than said limit, saving the compression result in the flash memory and directing a next compression result to be stored in the flash memory to a different location in the flash memory.

2. A method according to claim 1, comprising:
    receiving a piece of configuration data,
    writing said piece of configuration data into the volatile buffer, beginning at a location pointed at by a buffer write pointer,
    advancing the buffer write pointer to point at the next location in the volatile buffer that remains free after writing said piece of configuration data,
    compressing the contents of the volatile buffer, thus obtaining the compression result,
    writing the compression result into a first logical memory location in the non-volatile flash memory pointed at by a flash write pointer,
    if the length in bytes of the compression result was greater than a threshold value, advancing the flash write pointer to point at the next free location in a second logical memory location in the non-volatile flash memory, clearing the volatile buffer, and setting the buffer write pointer to point at the beginning of the volatile buffer, and if the length in bytes of the compression result was not greater than said threshold value, maintaining the flash write pointer pointing at the first logical memory location and preserving the contents of the volatile buffer.

3. A method according to claim 1, wherein storing the compression result in the flash memory includes storing in the flash memory a header field and a body field, of which said header field contains an indication of the length in bytes of the compression result.

4. A method according to claim 1, comprising:
observing that a space reserved from the flash memory for the records of a delta log file will become full, and
as a response to such observation, regenerating a complete configuration file, thus cancelling redundant changes of configuration, compressing the regenerated configuration file in one piece and storing the result of such compressing.

5. A method according to claim 1, comprising:
observing that a time limit has lapsed since the last time of storing in the flash memory new records of a delta log file, and
as a response to such observation, regenerating a complete configuration file, thus cancelling redundant changes of configuration, compressing the regenerated configuration file in one piece and storing the result of such compressing.

6. A method according to claim 1, wherein storing the compression result in the non-volatile flash memory is accomplished as an updating transaction directed to a record in the flash memory.

7. A router apparatus, comprising:
a processor,
a volatile memory and
a non-volatile flash memory;
wherein the processor is configured to:
add each received piece of configuration data at a next currently free location in a buffer contained in said volatile memory,
compress the contents of the buffer after adding each received piece of configuration data, thus obtaining a compression result,
store the compression result in said non-volatile flash memory,
if the compression result was shorter than a limit, allow the compression result to be overwritten in the flash memory by a next compression result to be stored in the flash memory, and
if the compression result was longer than said limit, save the compression result in the flash memory and direct a next compression result to be stored in the flash memory to a different location in the flash memory.

8. A router apparatus according to claim 7, wherein the size of the buffer in said volatile memory is more than ten times the size of a record in said flash memory.

9. A computer program product stored on a computer-readable medium, comprising software instructions that, when executed on a computer, cause the computer to execute the steps of:
adding each received piece of configuration data at a next currently free location in a volatile buffer,
compressing the contents of the volatile buffer after adding each received piece of configuration data, thus obtaining a compression result,
storing the compression result in a non-volatile flash memory,
if the compression result was shorter than a limit, allowing the compression result to be overwritten in the flash memory by a next compression result to be stored in the flash memory, and
if the compression result was longer than said limit, saving the compression result in the flash memory and directing a next compression result to be stored in the flash memory to a different location in the flash memory.

10. A method according to claim 2, wherein storing the compression result in the flash memory includes storing in the flash memory a header field and a body field, of which said header field contains an indication of the length in bytes of the compression result.

11. A method according to claim 2, comprising:
observing that a space reserved from the flash memory for the records of a delta log file will become full, and
as a response to such observation, regenerating a complete configuration file, thus cancelling redundant changes of configuration, compressing the regenerated configuration file in one piece and storing the result of such compressing.

12. A method according to claim 3, comprising:
observing that a space reserved from the flash memory for the records of a delta log file will become full, and
as a response to such observation, regenerating a complete configuration file, thus cancelling redundant changes of configuration, compressing the regenerated configuration file in one piece and storing the result of such compressing.

13. A method according to claim 2, comprising:
observing that a time limit has lapsed since the last time of storing in the flash memory new records of a delta log file, and
as a response to such observation, regenerating a complete configuration file, thus cancelling redundant changes of configuration, compressing the regenerated configuration file in one piece and storing the result of such compressing.

14. A method according to claim 3, comprising:
observing that a time limit has lapsed since the last time of storing in the flash memory new records of a delta log file, and
as a response to such observation, regenerating a complete configuration file, thus cancelling redundant changes of configuration, compressing the regenerated configuration file in one piece and storing the result of such compressing.

15. A method according to claim 4, comprising:
observing that a time limit has lapsed since the last time of storing in the flash memory new records of a delta log file, and
as a response to such observation, regenerating a complete configuration file, thus cancelling redundant changes of configuration, compressing the regenerated configuration file in one piece and storing the result of such compressing.

16. A method according to claim 2, wherein storing the compression result in the non-volatile flash memory is accomplished as an updating transaction directed to a record in the flash memory.

17. A method according to claim 3, wherein storing the compression result in the non-volatile flash memory is accomplished as an updating transaction directed to a record in the flash memory.

18. A method according to claim 4, wherein storing the compression result in the non-volatile flash memory is accomplished as an updating transaction directed to a record in the flash memory.

19. A method according to claim 5, wherein storing the compression result in the non-volatile flash memory is accomplished as an updating transaction directed to a record in the flash memory.

* * * * *